(12) United States Patent
King et al.

(10) Patent No.: US 8,152,672 B2
(45) Date of Patent: Apr. 10, 2012

(54) DIFFERENTIAL ASSEMBLY INCLUDING DIFFERENTIAL LOCK AND BLOCKING MEMBER

(75) Inventors: Darin D. King, Raymond, OH (US); Daniel T. Sellars, West Liberty, OH (US); Ryan J. Holoweiko, Powell, OH (US); Jason W. Grundey, Delaware, OH (US)

(73) Assignee: Honda Motor Company, Ltd., Tokyo (JP)

( * ) Notice: Subject to any disclaimer, the term of this patent is extended or adjusted under 35 U.S.C. 154(b) by 460 days.

(21) Appl. No.: 12/508,619

(22) Filed: Jul. 24, 2009

(65) Prior Publication Data

US 2011/0017540 A1 Jan. 27, 2011

(51) Int. Cl.
*B60K 17/35* (2006.01)
*B60K 23/08* (2006.01)
*F16H 48/30* (2012.01)
*F16H 48/20* (2012.01)

(52) U.S. Cl. .......... 475/84; 180/247; 180/249; 180/250; 475/237

(58) Field of Classification Search .................. 180/247, 180/248, 249, 250, 341; 475/84, 86, 88, 475/231, 237
See application file for complete search history.

(56) References Cited

U.S. PATENT DOCUMENTS

| | | | |
|---|---|---|---|
| 2,722,140 A | 11/1955 | Cabell | |
| 2,808,739 A | 10/1957 | Mueller | |
| 3,015,970 A | 1/1962 | Mueller | |
| 3,040,600 A | 6/1962 | Mueller | |
| 3,191,708 A * | 6/1965 | Simonds et al. | 180/250 |
| 3,748,928 A | 7/1973 | Shiber | |
| 3,871,249 A | 3/1975 | Jeffers | |
| 3,908,775 A * | 9/1975 | Van Fossen | 180/250 |
| 4,671,373 A | 6/1987 | Sigl | |
| 4,955,853 A | 9/1990 | Bausch | |
| 5,103,930 A | 4/1992 | Gierer | |
| 5,611,746 A * | 3/1997 | Shaffer | 475/88 |
| 5,882,272 A * | 3/1999 | Allonby | 475/86 |
| 5,897,601 A | 4/1999 | Suzuki | |
| 5,938,555 A | 8/1999 | Leeper | |
| 6,007,449 A * | 12/1999 | Okada et al. | 475/231 |
| 6,238,315 B1 | 5/2001 | Morse et al. | |
| 6,332,522 B1 | 12/2001 | Morse et al. | |
| 6,419,607 B1 | 7/2002 | Wild et al. | |
| 6,503,167 B1 * | 1/2003 | Sturm | 475/231 |
| 6,695,086 B2 * | 2/2004 | Kawamoto | 180/197 |
| 6,820,712 B2 | 11/2004 | Nakamura | |
| 7,025,700 B1 * | 4/2006 | Hoelscher | 475/84 |
| 7,896,771 B2 * | 3/2011 | Bowers | 475/231 |
| 2006/0154776 A1* | 7/2006 | Claussen et al. | 475/231 |
| 2006/0247087 A1* | 11/2006 | Pontanari et al. | 475/231 |
| 2011/0108352 A1* | 5/2011 | Haggerty | 180/348 |

\* cited by examiner

*Primary Examiner* — Joanne Silbermann
*Assistant Examiner* — Daniel Yeagley
(74) *Attorney, Agent, or Firm* — Ulmer & Berne LLP

(57) ABSTRACT

A differential assembly includes an axle, a differential, a differential lock, a blocking member, and a pump. The differential is coupled with the axle and configured to facilitate operation of the axle at an axle speed. The differential lock is associated with the differential and movable between a locked position and an unlocked position. The blocking member is associated with the differential lock and is movable between a blocking position and a non-blocking position. When the blocking member is in the blocking position, the differential lock is inhibited from moving to the locked position. The pump includes an outlet in fluid communication with the blocking member. The pump is operably coupled with the axle and is configured to facilitate movement of the blocking member into the blocking position when the axle speed is above a threshold speed. Vehicles including a differential assembly are also provided.

20 Claims, 14 Drawing Sheets

DIFFERENTIAL ASSEMBLY INCLUDING DIFFERENTIAL LOCK AND BLOCKING MEMBER

TECHNICAL FIELD

Vehicles are provided which include a differential lock and a pump that selectively inhibits operation of the differential lock.

BACKGROUND

Various motor vehicle differentials are known in the art. Differentials in two wheel drive vehicles are used to transfer torque from a driveshaft of a vehicle to a pair of driven axles to operate a pair of driven wheels, for example the left and right rear wheels of the vehicle. The differential permits the two driven axles to rotate at the same speed when the vehicle is traveling straight on a roadway and also permits the two axles to rotate at different speeds as required when the vehicle is turning or when traction is reduced at one of the driven wheels.

In some instances it is desirable to lock the differential to prevent the two axles from rotating at different speeds. For example, if one of the wheels loses traction and spins due to operation on a slippery surface such as ice, snow, sand, mud etc., the opposite wheel will lose torque in proportion to the traction lost by the spinning wheel. Consequently, the wheel opposite the spinning wheel may remain motionless and the vehicle is not propelled. Various devices are known that resolve this problem including differential locks.

One known differential lock is incorporated into a differential assembly. The differential lock includes a collar that is movable between unlocked and locked positions. In the unlocked position, the collar is splined to the differential but is disengaged from the axles so that the two driven axles are free to rotate at different speeds. In the locked position, the collar is splined to one of the axles and a rotatable carrier of the differential, which locks the differential. This prevents the two driven axles from rotating at different speeds during operation of the vehicle.

SUMMARY

In accordance with one embodiment, a differential assembly comprises an axle, a differential, a differential lock, a blocking member, and a pump. The differential is coupled with the axle and is configured to facilitate operation of the axle at an axle speed. The differential lock is associated with the differential and is movable between a locked position and an unlocked position. The blocking member is associated with the differential lock and is movable between a blocking position and a non-blocking position. When the blocking member is in the blocking position, the differential lock is inhibited from moving to the locked position. The pump comprises an outlet in fluid communication with the blocking member. The pump is operably coupled with the axle and is configured to facilitate movement of the blocking member into the blocking position when the axle speed is above a threshold speed.

In accordance with yet another embodiment, a differential assembly comprises a differential, a differential lock, a blocking member, and a pump. The differential comprises an input member and a housing. The input member is configured for operation at an input speed. The housing defines a fluid receptacle. The differential lock is associated with the differential and is movable between a locked position and an unlocked position. The blocking member is associated with the differential lock and is movable between a blocking position and a non-blocking position. When the blocking member is in the blocking position, the differential lock is inhibited from moving to the locked position. The pump includes an inlet and an outlet. The pump is rotatably coupled with the input member. The pump is at least partially disposed within the fluid receptacle. The inlet is in fluid communication with the fluid receptacle. The outlet is in fluid communication with the blocking member. The pump is configured to facilitate movement of the blocking member into the blocking position when the input speed is above a threshold speed.

In accordance with yet another embodiment, a differential assembly comprises a left axle, a right axle, a housing, a differential, a differential lock, a blocking member, and a gerotor. The housing defines a fluid receptacle. The differential is supported within the fluid receptacle. The differential is coupled with the left and right axles and is configured to facilitate operation of the left and right axles at respective left and right axle speeds. The differential lock is associated with the differential and one of the left and right axles. The differential lock is movable between a locked position and an unlocked position. The blocking member is associated with the differential lock and is movable between a blocking position and a non-blocking position. When the blocking member is in the blocking position, the differential lock is inhibited from moving to the locked position. The gerotor is disposed at least partially within the fluid receptacle and is coupled with one of the left and right axles. The gerotor comprises an outlet and an inlet. The outlet is in fluid communication with the blocking member. The inlet is in fluid communication with the fluid receptacle. The gerotor facilitates movement of the blocking member into the blocking position when one of the left and right axle speeds is above a threshold speed.

In accordance with yet another embodiment, a vehicle comprises a left axle, a right axle, a left wheel, a right wheel, a differential, a differential lock, a blocking member, and a pump. The left wheel is rotatably coupled with the left axle. The right wheel is rotatably coupled with the right axle. The differential is coupled with the left axle and the right axle. The differential is configured to facilitate operation of at least one of the left and right axle at an axle speed. The differential lock is associated with the differential and is movable between a locked position and an unlocked position. The blocking member is associated with the differential lock and is movable between a blocking position and a non-blocking position. When the blocking member is in the blocking position, the differential lock is inhibited from moving to the locked position. The pump comprises an outlet in fluid communication with the blocking member. The pump is operably coupled with one of the left axle and the right axle. The pump is configured to facilitate movement of the blocking member into the blocking position when the axle speed is above a threshold speed.

BRIEF DESCRIPTION OF THE DRAWINGS

Various embodiments will become better understood with regard to the following description, appended claims and accompanying drawings wherein:

DETAILED DESCRIPTION

Figure 1:
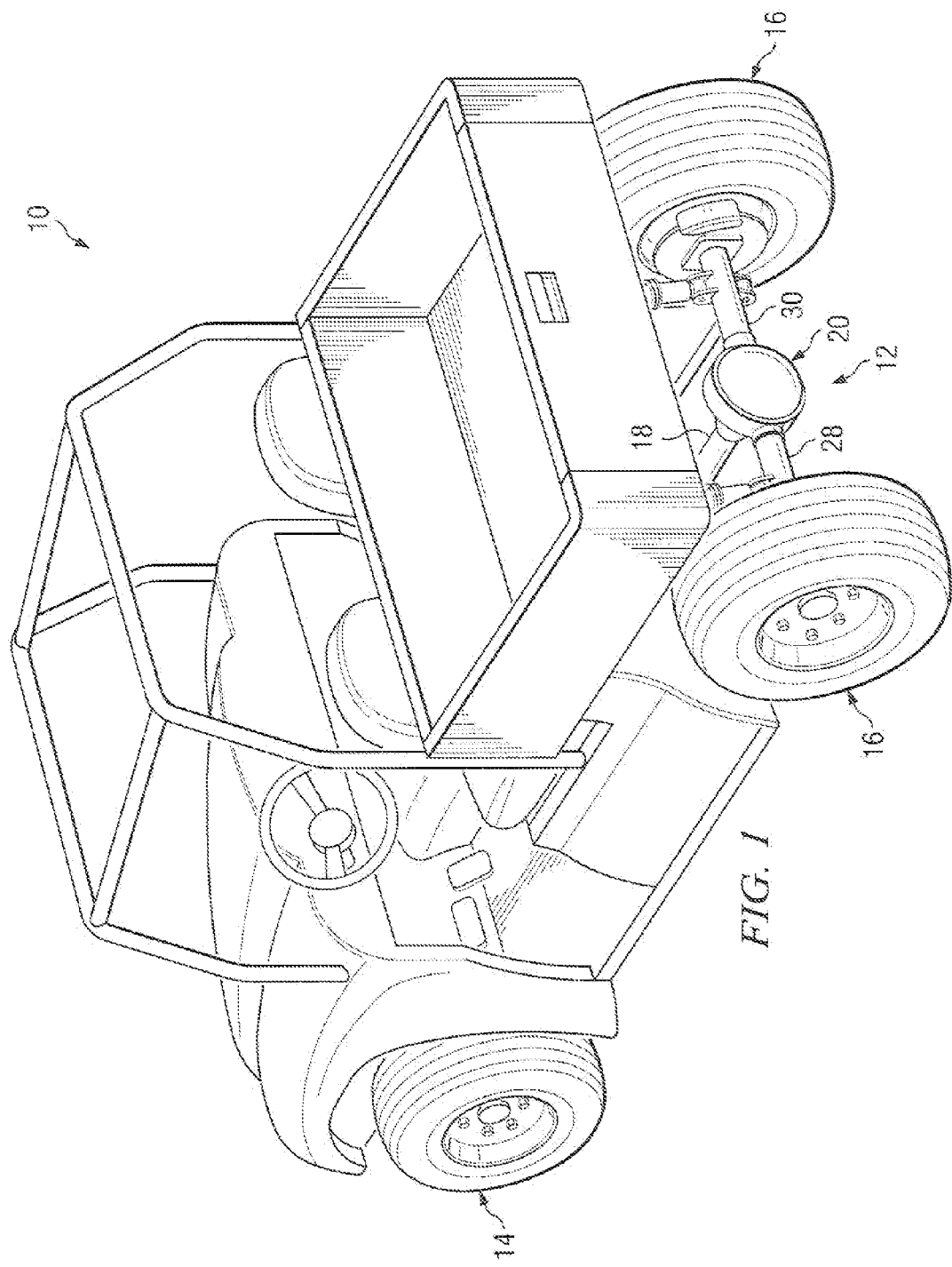
FIG. 1 is a left rear perspective view of a vehicle incorporating an axle assembly.

Referring to the drawings, wherein like reference numbers indicate the same or corresponding elements throughout the views, FIG. 1 illustrates a vehicle 10 that can incorporate a rear axle assembly 12 according to one embodiment. The rear axle assembly 12 can be used on a small utility vehicle, such as vehicle 10 shown in FIG. 1 and can also be used on a variety of other vehicles including all terrain vehicles, golf carts, "dune buggies", automobiles, and trucks.

Vehicle 10 includes two front wheels 14 (one shown) and two rear wheels 16. Vehicle 10 also includes a source of motive power (not shown) and a drivetrain, which includes a driveshaft 18 and the rear axle assembly 12, for transferring torque from the source of motive power to the rear wheels 16. The source of motive power can be an internal combustion engine, which can use one or more of a variety of fuels, an electric motor or any other suitable source of motive power.

Figure 2:
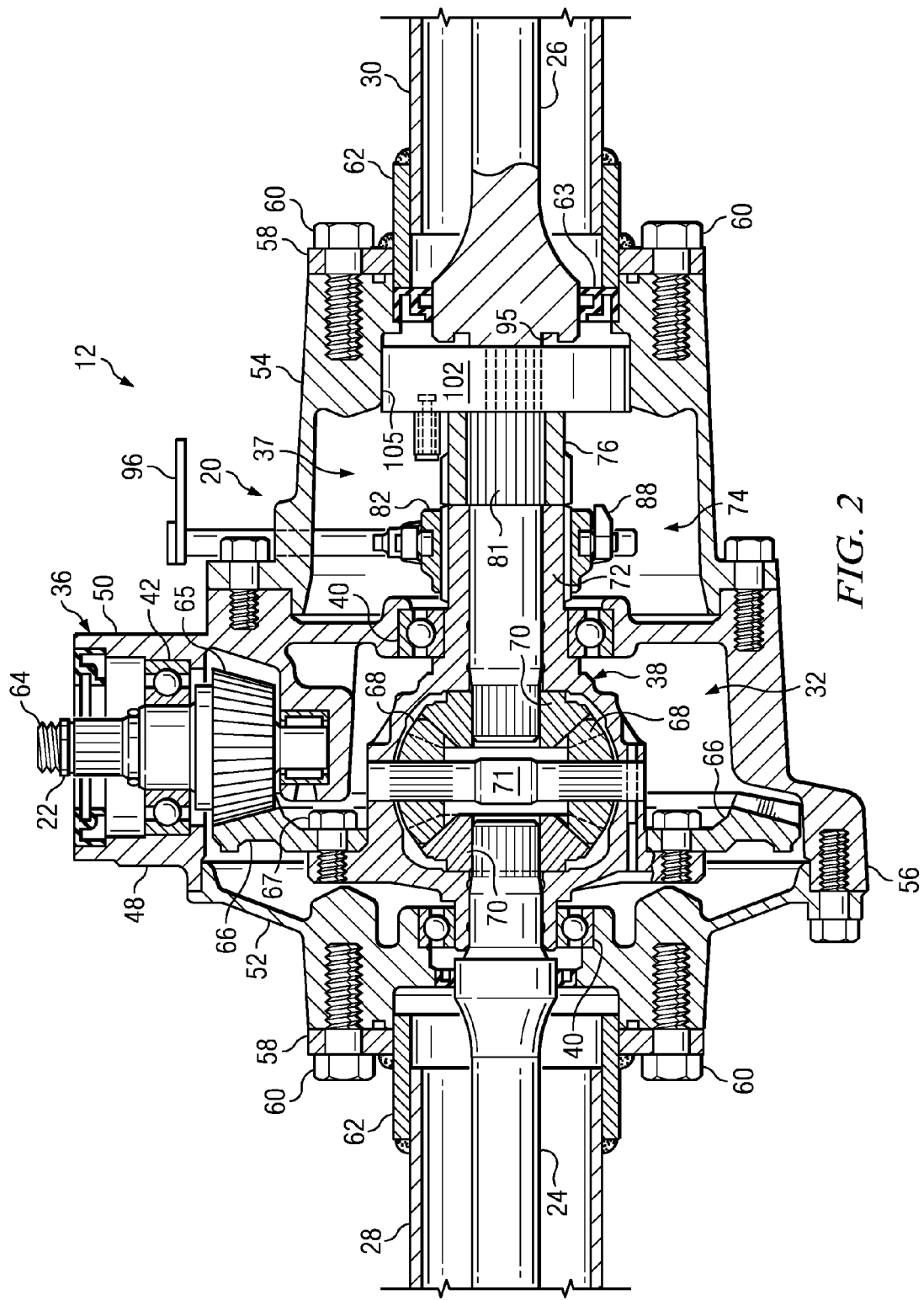
FIG. 2 is a cross-sectional view of the axle assembly shown schematically in FIG. 1, according to one embodiment, with a lock collar of a differential lock of the axle assembly in an unlocked position and a blocking member in a non-blocking position.
Figure 3:
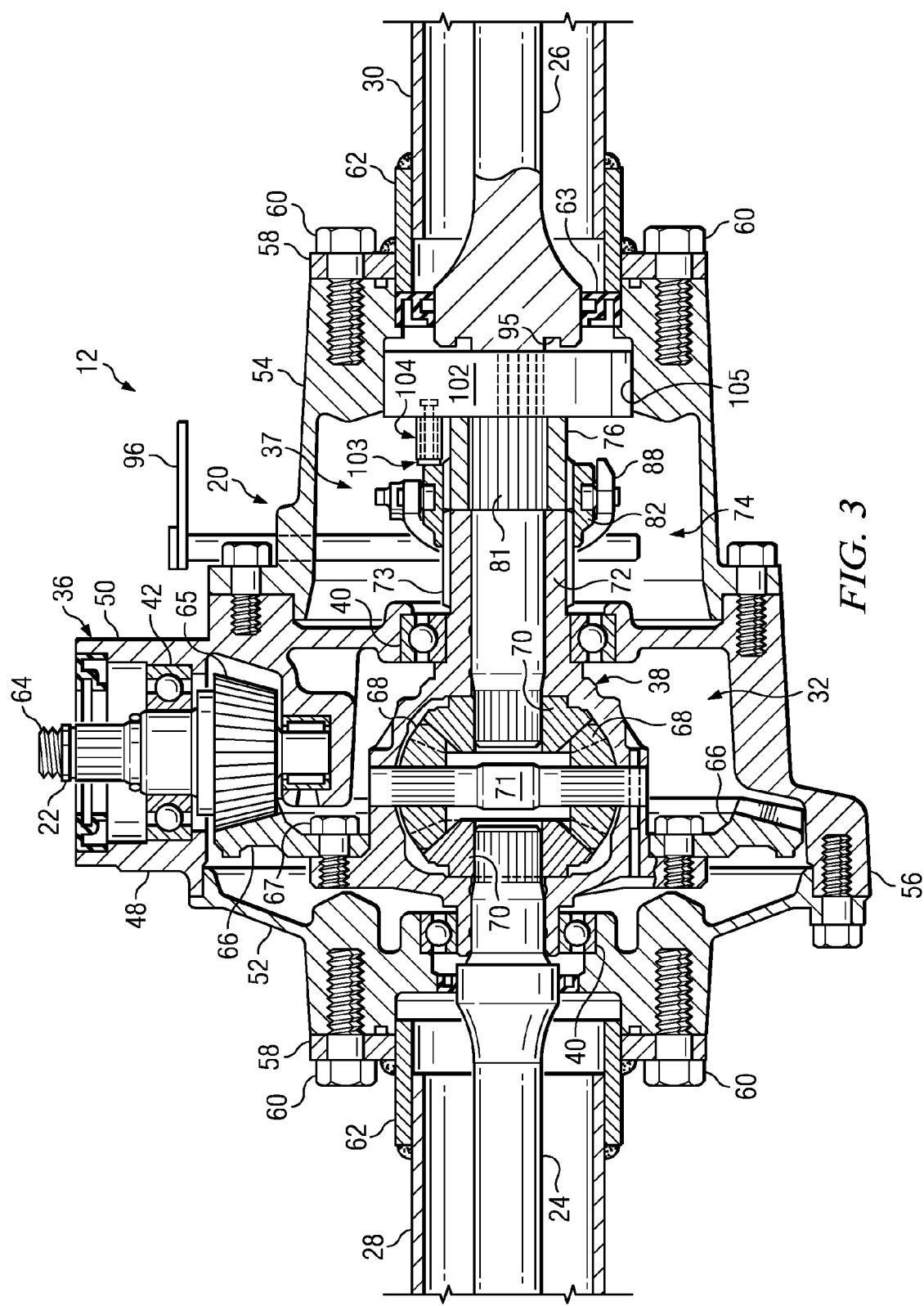
FIG. 3 is a cross-sectional view similar to FIG. 2, but with the lock collar in a locked position.

Referring to FIGS. 1-4, the rear axle assembly 12 can include a differential assembly 20, an input member 22 that can be coupled to the driveshaft 18, a left axle 24 and a right axle 26. Some components of axle assembly 12 are shown in elevation in FIGS. 2-4 for clarity of illustration, and axle assembly 12 is shown schematically in FIG. 1. In one embodiment, left and right axles 24 and 26 can be rotatable rear axles. Left axle 24 can be disposed within a stationary axle tube 28 and the right axle 26 can be disposed within a stationary axle tube 30 as shown in FIGS. 2 and 3. Left and right axles 24 and 26 can be rotatably coupled with respective ones of the front or rear wheels 16, 18 in a manner known in the art.

The differential assembly 20 can include a differential 32 and a housing 36. The differential 32 can be supported within a fluid receptacle 37 that is defined by the housing 36. As is common, differential fluid (e.g., differential oil) can be provided within the fluid receptacle 37 to lubricate the differential 32 during operation. The differential 32 can include a rotatable carrier 38 that can be journalled within the housing 36 by a pair of bearings 40. The rotatable carrier 38 can be rotatably coupled with input member 22 and left and right 24, 26 axles as subsequently described in greater detail. The input member 22 can be journalled within the housing 36 by a bearing 42. During operation of vehicle 10, the differential 32 transfers torque from the input member 22 to the left rear axle 24 and the right rear axle 26.

The housing 36 can include multiple members. For example, the housing 36 can include members 48, 50 that cooperate to define an opening suitable to permit input member 22 to extend through housing 36. The bearing 42 can be positioned between the input member 22 and both of the members 48, 50 of housing 36. The housing 36 can also include a member 52 which journals the left one of bearings 40 and members 54 and 56, which can be connected to one another. Members 50 and 56 can cooperate to journal the right one of bearings 40.

Figure 4:
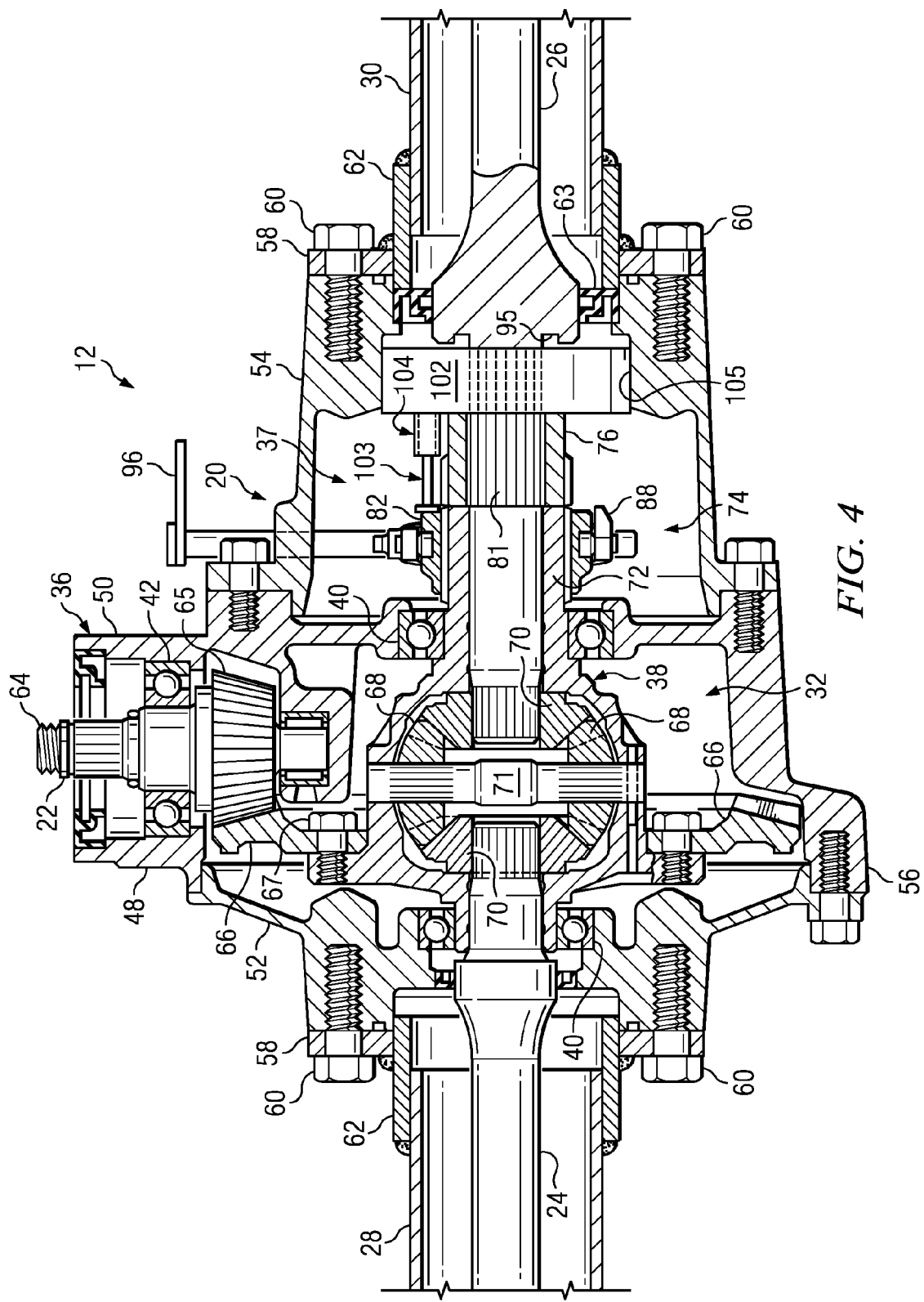
FIG. 4 is a cross-sectional view similar to FIG. 2, but with the lock collar in an unlocked position and the blocking member in a blocking position.

Differential assembly 20 can include a pair of covers 58. The covers 58 can be fastened to the housing 36 using conventional fasteners such as bolts 60. The differential assembly 20 can also include a pair of sleeves 62, with one of the sleeves 62 co-axially disposed about axle tube 28 and secured to axle tube 28, for example by welding. The other sleeve 62 can be co-axially disposed about the axle tube 30 and secured to axle tube 30, for example by welding. Differential assembly 20 can also include a seal 63 that can be annularly disposed between the right axle 26 and the housing 36 of the differential 32, as shown in FIGS. 2-4. Seal 63 can be effective for retaining, or at least substantially retaining, differential fluid within the fluid receptacle 37.

The input member 22 can be coupled at a first end 64 to the drive shall 18. The opposite end of the input member 22 can include a pinion gear 65 that meshes with a ring gear 66 that can be secured to the rotatable carrier 38 by conventional fasteners such as a plurality of bolts (e.g., bolts 67). Accordingly, during operation of vehicle 10, rotation of driveshaft 18 causes the input member 22 (e.g., at an input speed), which, in turn, causes rotation of the rotatable carrier 38 to rotate. The differential assembly 20 further includes a set of differential gears that can include a plurality of spider gears 68 and a pair of side gears 70. The spider gears 68 can be secured to a shaft 71 which is secured to the rotatable carrier 38. Accordingly, spider gears 68 are rotatable with the rotatable carrier 38. Each spider gear 68 meshes with both of the side gears 70.

As shown in FIGS. 2-4, one of the side gears 70 is secured to an inboard end of the right axle 26, while the other side gear 70 is secured to an inboard end of the left axle 24. The side gears 70 can be splined to the respective one of the left and right axles 24, 26. Accordingly, it may be appreciated that rotation of the rotatable carrier 38 causes the left and right axles 24, 26 to rotate, which in turn rotates the associated wheels (e.g., rear wheels 16). As known in the art, when the differential 32 is unlocked, spider gears 68 cooperate with the side gears 70 so that the axles 24 and 26 can rotate at the same speed when the vehicle 10 is traveling straight on a roadway and also cooperate to permit axles 24 and 26 to rotate at different axle speeds as required when the vehicle 10 is turning or when traction is reduced at one of the associated wheels.

The rotatable carrier 38 can include a sleeve 72 that is sized to receive the right axle 26. The sleeve 72 of the rotatable carrier 38 can include a plurality of circumferentially spaced external splines (e.g., 73).

Axle assembly 12 can further include a differential lock, indicated generally at 74. The differential lock 74 permits the operator of vehicle 10 to selectively lock differential 32 to prevent the left and the right rear axles 24, 26 from rotating relative to one another, and accordingly, to prevent the two wheels from rotating relative to one another. This can be desirable in certain instances, for example when one of the rear wheels 16 is spinning due to engagement with a slippery surface such as ice, snow, sand, mud etc.

Figure 5:
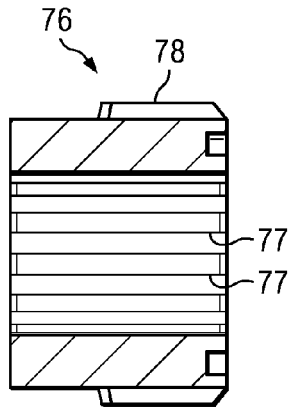
FIG. 5 is an enlarged cross-sectional view of the lock sleeve shown in FIGS. 2-4.

The differential lock 74 can include a lock sleeve 76. As illustrated in FIG. 5, the lock sleeve 76 can have a plurality of circumferentially spaced internal splines 77 and a plurality of circumferentially spaced external splines 78. The lock sleeve 76 can be co-axially disposed about the right rear axle 26. In other embodiments (not shown), the differential lock 74 can be associated with the left axle 24. Additionally, it will be appreciated that in other vehicles having a front differential and driven front wheels, the differential lock 74 can be associated with either one of the driven front axles.

Figure 6:
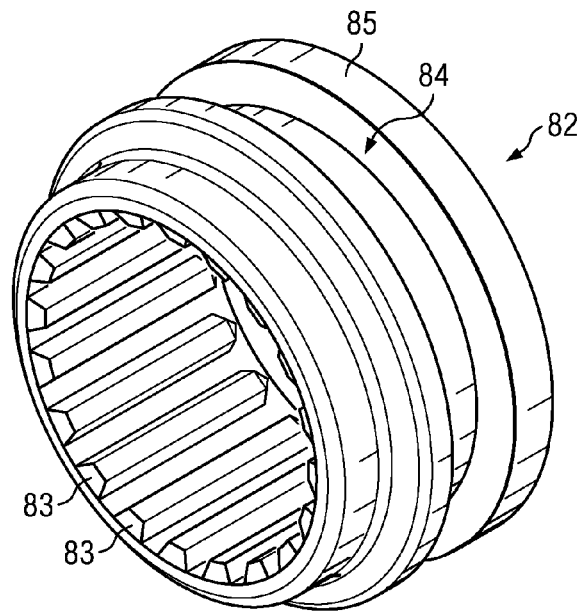
FIG. 6 is an enlarged perspective view of the lock collar shown in FIGS. 2-4.

The lock sleeve 76 can be splined to the right axle 26, with the internal splines 77 of lock sleeve 76 meshed with external splines 81 of the right axle 26. Accordingly, lock sleeve 76 can be rotatable with the right axle 26. The differential lock 74 can also include a lock collar 82 that is co-axially disposed about the sleeve 72. As illustrated in FIG. 6, the lock collar 82 can include a plurality of circumferentially spaced internal splines 83 and an annular groove 84 formed in an outer surface 85 of the lock collar 82.

Figure 7:
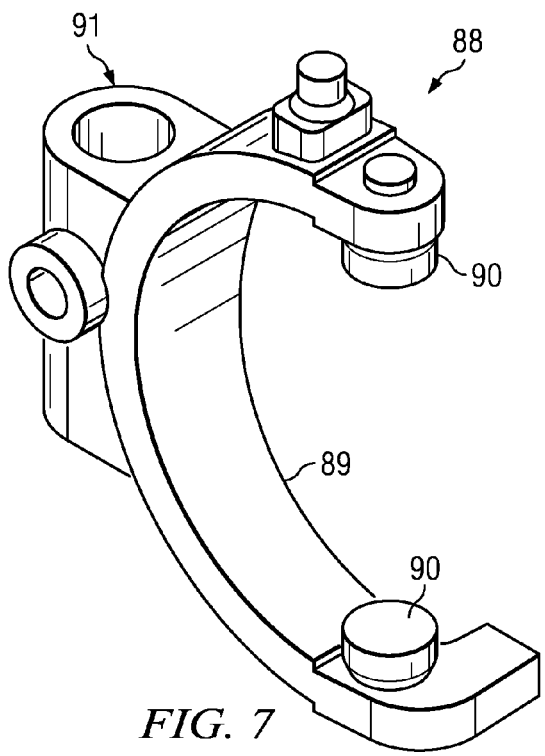
FIG. 7 is an enlarged perspective view of the lock fork shown in FIGS. 2-4.

The lock collar 82 is laterally movable relative to the lock sleeve 76 of the differential lock 74 and the sleeve 72 of the rotatable carrier 38 between an unlocked position (e.g., as illustrated in FIG. 2) and a locked position (e.g., as illustrated in FIG. 3). Lock collar 82 can be moved between the locked and unlocked positions by a lock fork 88 that engages the lock collar 82. As shown in FIG. 7, lock fork 88 can include a circumferentially extending member 89 that can extend partially around the lock collar 82. For example, in one embodiment the circumferentially extending member 89 can encircle about one-half of the circumference of lock collar 82. The lock fork 88 can further include a plurality of protrusions 90 that extend radially inwardly from the extending member 89. The protrusions 90 can be disposed within the circumferentially extending groove 84 of lock collar 82. Lock fork 88 can also include an attachment member 91.

Figure 8:
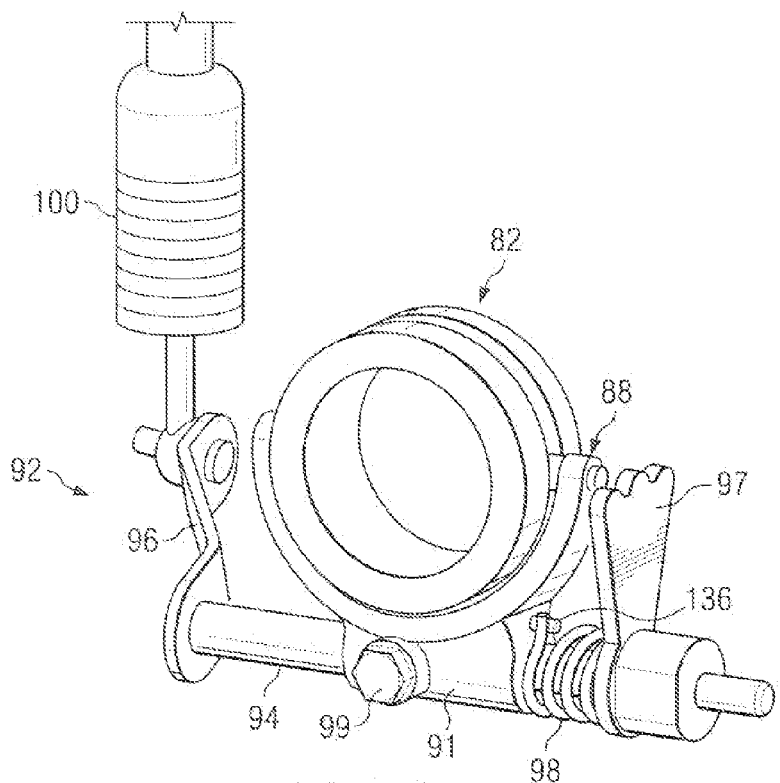
FIG. 8 is an enlarged perspective view of the shift assembly along with various other differential lock components partially shown in FIGS. 2-4.

As illustrated in FIG. 8, the differential lock 74 can include a shift assembly 92. The shift assembly 92 can include a shaft 94, a shift arm 96, a stop member 97, a resilient member 98. The attachment member 91 can be supported along the shaft 94 and secured to the shaft 94 with a bolt 99. The stop member 97 can be secured to the shaft (e.g., through welding). A differential lock cable 100 can be operably coupled with the shift arm 96.

When the lock collar 82 is in the unlocked position as shown in FIG. 2, the lock collar 82 is engaged with the sleeve 72 for rotation with the rotatable carrier 38, but is disengaged from the lock sleeve 76. When lock collar 82 is in the unlocked position, the internal splines 83 of lock collar 82 are meshed with the external splines 73 of the sleeve 72. Also, when lock collar 82 is in the unlocked position as shown in FIG. 2, the differential 32 is "unlocked" and the right axle 26 and the left axle 24 are free to rotate relative to the rotatable carrier 38 and are also free to rotate relative to one another.

When the lock collar 82 is in the locked position as shown in FIG. 3, the lock collar 82 is engaged with both the sleeve 72 of the rotatable carrier 38 and the lock sleeve 76. In this position, the internal splines 83 of lock collar 82 are meshed with the external splines 73 of the sleeve 72 of the rotatable carrier 38 and are also meshed with the external splines 78 of lock sleeve 76, which locks the differential 32. Accordingly, when the lock collar 82 is in the locked position shown in FIG. 3, the lock sleeve 76, the rotatable carrier 38 and the right axle 26 rotate at the same speed when the vehicle 10 is in operation. Additionally, when lock collar 82 is in the locked position, the left axle 24 is prevented from rotating relative to rotatable carrier 38 and the right rear axle 26. Consequently, left and right axles 26, 28 and respective associated wheels can rotate at the same speed during operation of vehicle 10, when the lock collar 82 is in the locked position shown in FIG. 3 such that the differential 32 is locked.

The differential assembly 20 can include a pump and a blocking member. The pump can be operably coupled with one of the input member 22, the right axle 26, and the left axle 28. The blocking member can be associated with the differential lock 74 and configured to inhibit locking of the differential 32. The pump can be in fluid communication with the blocking member. Operation of the pump can facilitate operation of the blocking member to selectively inhibit locking of the differential 32.

Figure 9:
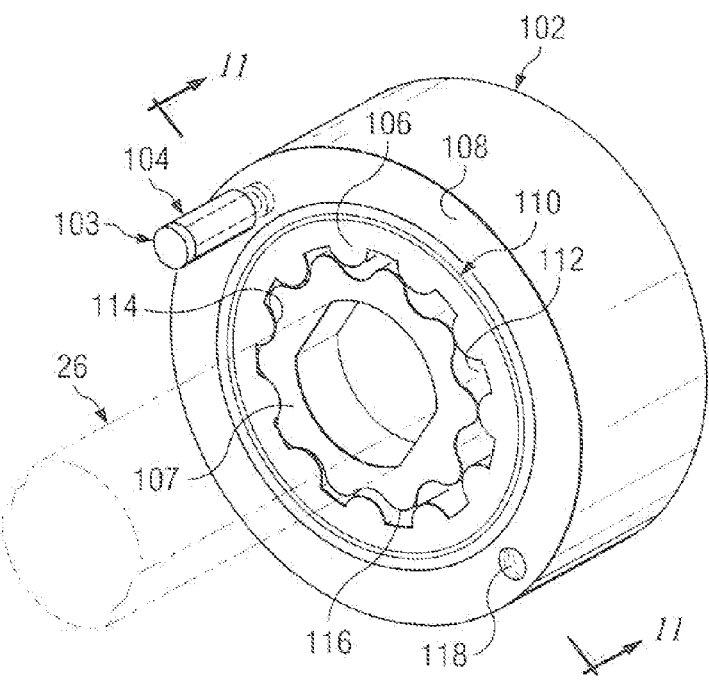
FIG. 9 is an enlarged perspective view of the gerotor shown in FIGS. 2-4, with the blocking member in the non-blocking position and with cover omitted for purpose of illustration.
Figure 10:
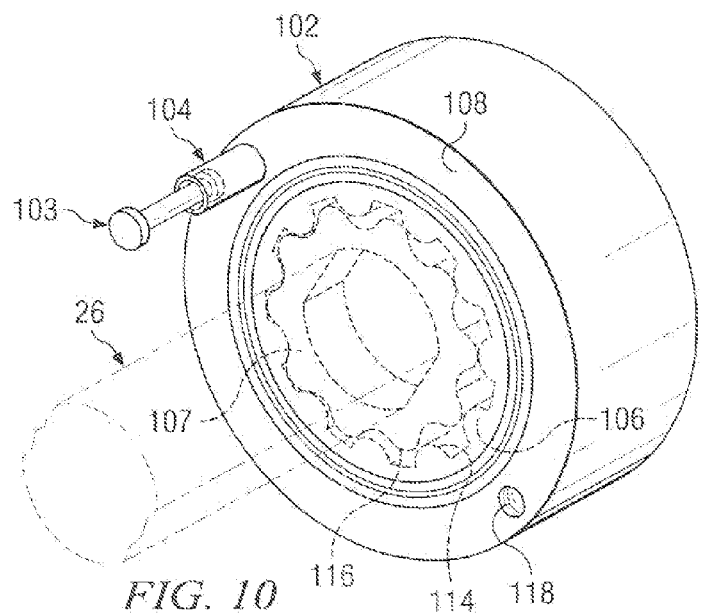
FIG. 10 is an enlarged perspective view of the gerotor shown in FIG. 9, but with the blocking member in the blocking position.

In one embodiment, the pump can include a positive displacement pump such as a gerotor 102, for example. As illustrated in FIGS. 9 and 10, the gerotor 102 can movably support a blocking member 103 (e.g., in a linear actuator-type arrangement). In particular, the blocking member 103 can move between a non-blocking position (as illustrated in FIG. 9) and a blocking position (as illustrated in FIG. 10). When in the non-blocking position shown in FIG. 9, the blocking member 103 can be retracted into a sleeve 104 that is coupled with the gerotor 102. When in the blocking position shown in FIG. 9, the blocking member 103 can be extended from the sleeve 104.

The gerotor 102 can be supported adjacent to the differential lock 74 such that the blocking member 103 can selectively inhibit the lock collar 82 from moving into the locked position. In one embodiment, as illustrated in FIGS. 2-4, the gerotor 102 can be supported by a shoulder 105 that is defined by the member 54 of housing 36. When in this location with the blocking member 103 in the non-blocking position, as illustrated in FIGS. 2 and 3, the lock collar 82 can move between the unlocked and locked position. However, when the blocking member 103 is moved to the blocking position, as illustrated in FIG. 4, the blocking member 103 contacts the locking collar 82 to inhibit the locking collar 82 from moving to the locked position.

As illustrated in FIGS. 9 and 10, the gerotor 102 can include an outer rotor 106, all inner rotor 107, and a carrier 108. The carrier 108 can define a chamber 110. The outer rotor 106 can be disposed within the chamber 110 and rotatably supported by the carrier 108. The inner rotor 107 can be disposed within the outer rotor 106. The outer rotor 106 can include inwardly extending teeth 114 disposed along an inner radius and the inner rotor 107 can include outwardly extending teeth 116 disposed along an outer radius. The inwardly and outwardly extending teeth 114, 116 are configured to mesh with one another. The gerotor 102 can also include a cover 117 (FIG. 11) for covering the outer and inner rotors 106, 107 and sealing the chamber 110.

Figure 12:
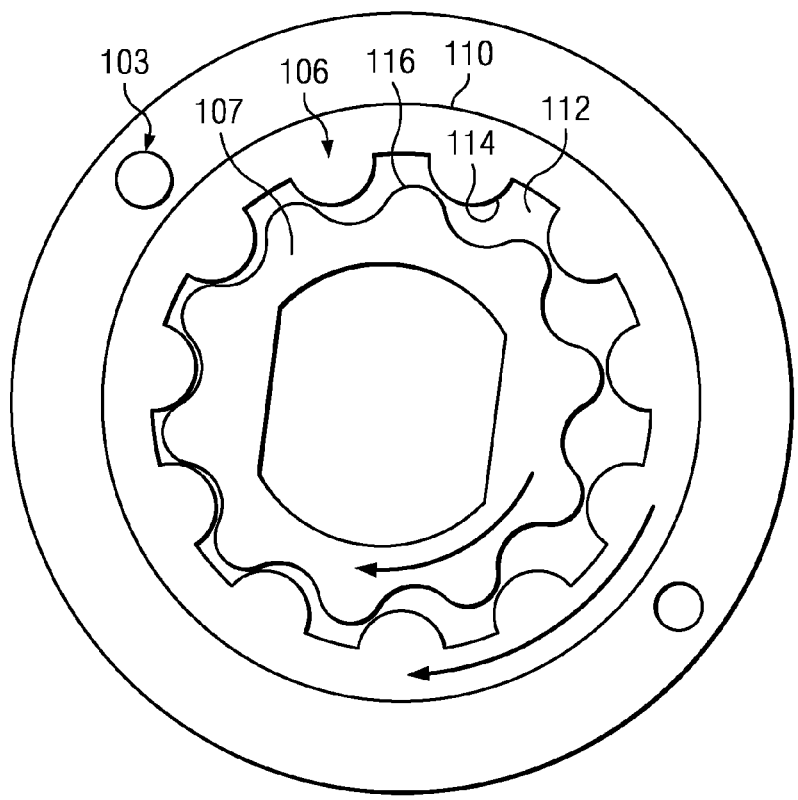
FIG. 12 is a front elevational view of the gerotor shown in FIGS. 9 and 10, depicting rotation of an inner rotor and an outer rotor.

The outer rotor 106 and inner rotor 107 cooperate to define a fluid receptacle 112. The inner rotor 107 can be rotated with respect to the carrier 108. As illustrated in FIG. 12, rotation of the inner rotor 107 correspondingly rotates the outer rotor 106 with respect to the carrier 108. The carrier 108 can define an inlet 118 that is in fluid communication with the receptacle 112.

In one embodiment, the gerotor 102 can be coupled with the right axle 26. In such an embodiment, as illustrated in FIGS. 9 and 10, the inner rotor 107 can be radially disposed about the right axle 26 such that rotation of the right axle 26 rotates the inner and outer rotors 107, 106. In an alternative embodiment, the gerotor 102 can be coupled with the left axle 28.

Figure 11:
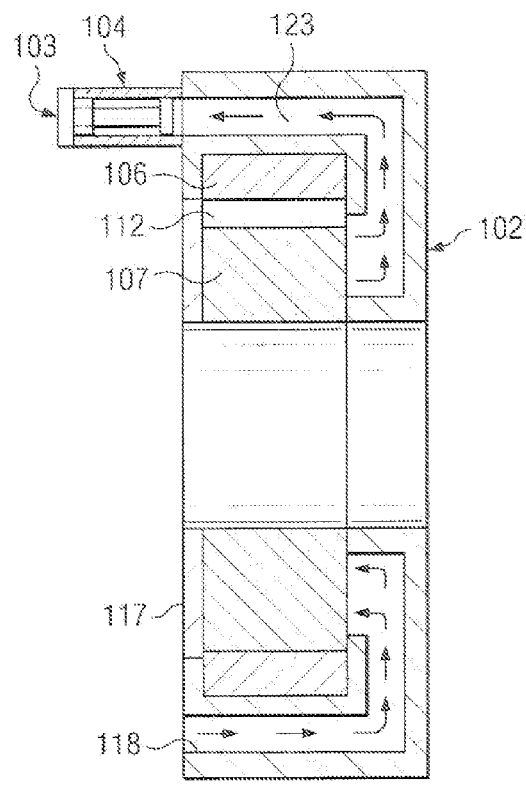
FIG. 11 is a cross-sectional view taken along the line 11-11 of the gerotor shown in FIG. 9.

As illustrated in FIGS. 2-4, the gerotor 102 can be disposed within the fluid receptacle 37 such that the inlet 118 is in fluid communication with the fluid receptacle 37. In such an arrangement, when the right axle 26 rotates, the gerotor 102 can pump differential fluid from the fluid receptacle 37 to move the blocking member 103 to the blocking position. For example, as illustrated in FIG. 11, the gerotor 102 can further define an outlet 123 that is in communication with the receptacle 112 (e.g., similar to the fluid communication between the inlet 118 and the receptacle 112). The blocking member 103 can be in fluid communication with the outlet 123. In such an arrangement, fluid can be pumped to the blocking member 103 to move the blocking member 103 from a non-blocking position (as illustrated in FIG. 9) to a blocking position (as illustrated in FIG. 10). For example, when the inner rotor 107 and outer rotor 106 are rotated with respect to the carrier 108, as illustrated in FIG. 12, fluid can be pumped from the inlet 118, to the fluid receptacle 112, through the outlet 123 and to the blocking member 103. It will be appreciated that the differential assembly can include any of a variety of suitable alternative pumps.

Figure 13A:
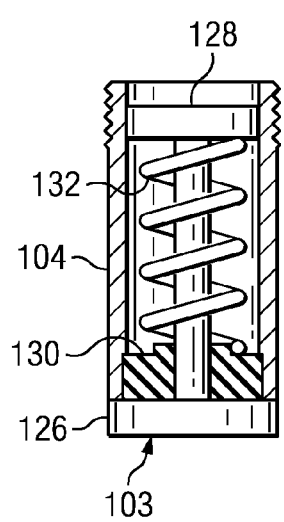
FIGS. 13A and 13B are cross-sectional views of the blocking member shown in FIGS. 9 and 10, wherein the blocking member is shown in respective non-blocking and blocking positions.
Figure 13B:
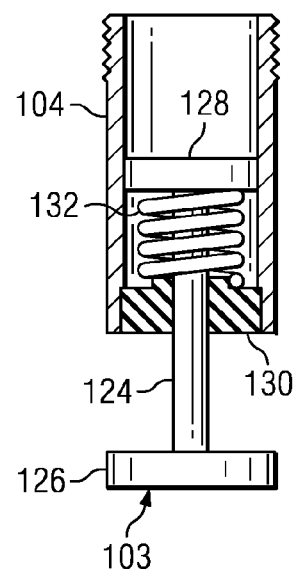

As illustrated in FIGS. 13A and 13B, the blocking member 103 can include an elongate member 124 that includes a blocking end 126 and a hydraulic end 128. The blocking member 103 can further include a seal 130 that can be annularly disposed between the elongate member 124 and the sleeve 104. Seal 130 is effective for retaining, or at least substantially retaining, fluid within the sleeve 104. The blocking member 103 can further include a resilient member 132 disposed between the seal 130 and the hydraulic end 128. When the blocking member is in the non-blocking position, as illustrated in FIG. 13A, the resilient member 132 can resist movement of the blocking member 103 into the blocking position. Once fluid pressure generated by the gerotor 102 (e.g., through rotation of the outer and inner rotors 106, 107) overcomes the resistance of the resilient member 132, the blocking member 103 can move into the blocking position, as illustrated in FIG. 13B. If the blocking member 103 is moved to the blocking position, as illustrated in FIG. 13B, and the pressure within the gerotor 102 no longer overcomes the resistance of the resilient member 132, the resilient member 132 can automatically return the blocking member 103 to the non-blocking position.

Figure 14A:
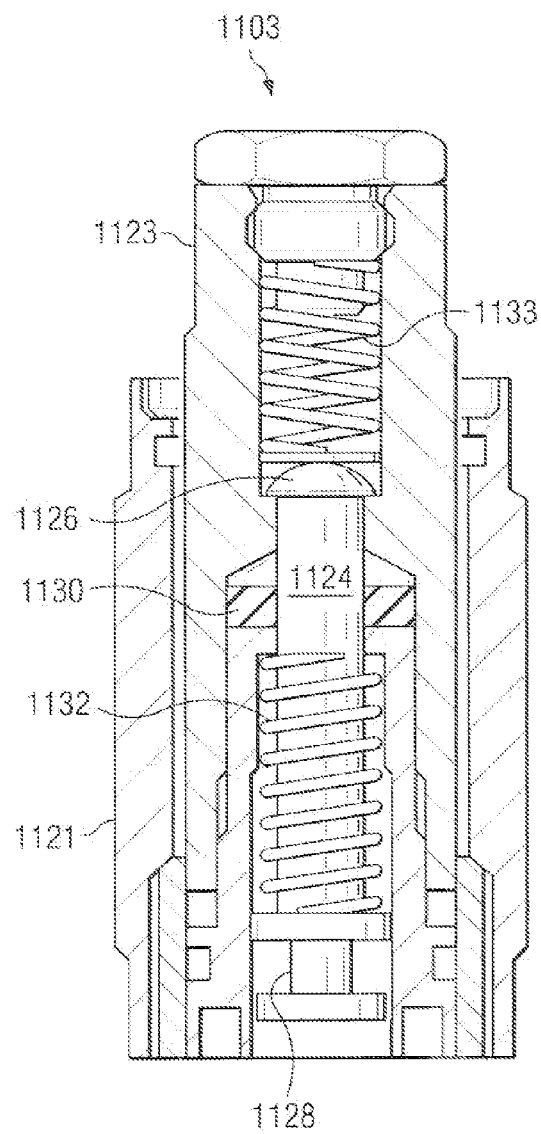
FIGS. 14A and 14B are cross-sectional views of a blocking member according to an alternative embodiment, wherein the blocking member is shown in respective non-blocking and blocking positions.
Figure 14B:
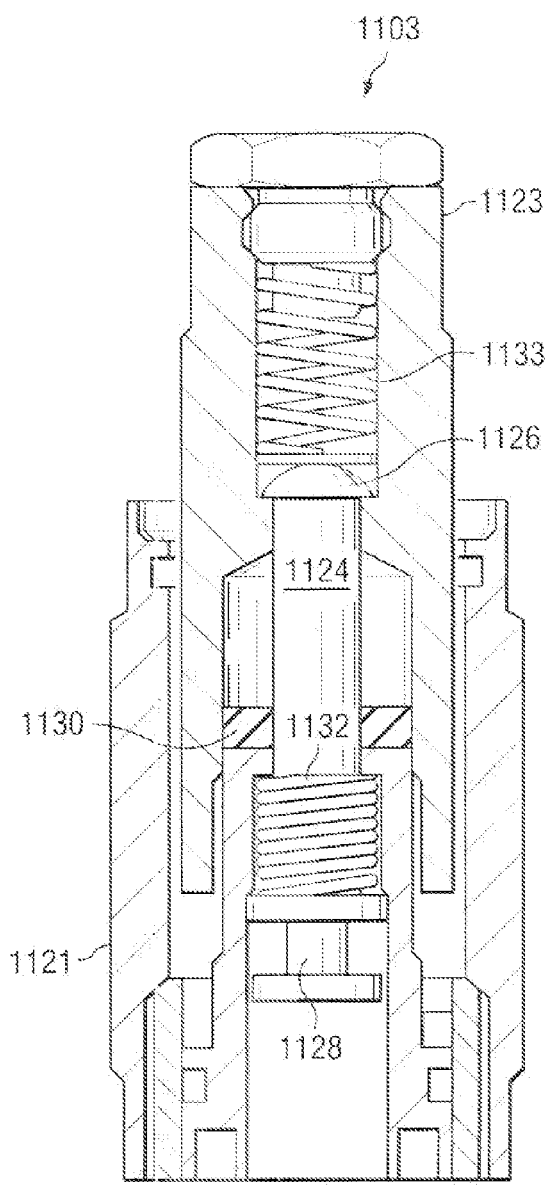

It will be appreciated, that a blocking member can be provided in any of a variety of suitable alternative arrangements. For example, as illustrated in FIGS. 14A and 14B, in an alternative embodiment, a blocking member 1103 can be provided in a poppet-valve arrangement. In such an arrangement, the blocking member 1103 can include an outer casing 1121, an inner casing 1123, and an elongate member 1124. The elongate member 1124 can include a blocking end 1126 and a hydraulic end 1128. The blocking member 1103 can further include a seal 1130 that can be annularly disposed between the elongate member 1124 and the inner casing 1123. A first resilient member 1132 can be disposed between the seal 1130 and the hydraulic end 1128. A second resilient member 1133 can be contained within the inner casing 1123. When the blocking member 1103 is in the non-blocking position, as illustrated in FIG. 14A, the resilient member 1132 can resist movement of the inner casing 1123 into the blocking position. Once the pressure from of the gerotor 102 overcomes the resistance of the resilient member 1132, inner casing 1123 can move into the blocking position, as illustrated in FIG. 14B. If the inner casing 1123 is in the blocking position, as illustrated in FIG. 14B, and the pressure within the gerotor 102 is subsequently reduced such that it is not enough to overcome the resistance of the resilient member 1132, the resilient member 1132 can automatically return the inner casing 1123 to the non-blocking position. In such an embodiment, the resilient member 1133 can serve as a cushioning member during movement of the inner casing 1121 from the non-blocking position to the blocking position.

Although, the blocking member is shown and described as being coupled with the gerotor 102, it will be appreciated that a blocking member can be provided separate from the gerotor 102, as in the example described below. It will also be appreciated that a gerotor can be provided along the axle assembly 12 in any of a variety of suitable alternative arrangements. For example, a gerotor can be coupled with an axle but disposed outside of a fluid receptacle. In such an embodiment, the gerotor's inlet can be in fluid communication with a fluid receptacle (e.g., by way of dedicated passageway) such that the gerotor can use differential fluid to actuate the blocking member. In yet another example, a gerotor can be a self contained unit that uses dedicated fluid to actuate the blocking member.

It will be appreciated that, when axle speed increases (e.g., to accelerate the vehicle 10), movement of the components of the differential 32 (e.g., the rotatable carrier 38, the spider gears 68, the side gears 70, the shaft 71) correspondingly increases. As the speed of these components increases, it may become more difficult to move the lock collar 82 without damaging the axle assembly 12. For example, when the axles are operating above a rotational speed that facilitates a vehicle speed of about 6 M.P.H., movement of the lock collar 82 may harm the differential 32. Therefore, the gerotor 102 can be configured to inhibit movement of the lock collar 82 into the locked position when the axle speed is above a threshold speed. In one embodiment, the resilient member 132 can be configured to permit movement of the blocking member 103 to the blocking position at a particular threshold speed. As the axle speed increases, the rotation of the inner and outer rotors 107, 106 correspondingly increases to increase the fluid pressure applied to the hydraulic end 128 of the blocking member 103. Therefore, the resilient member 132 can be selected to have a spring constant that resists movement of the blocking member 103 until the axle speed reaches a predetermined threshold speed. Consequently, until the axle speed reaches the threshold speed, the blocking member 103 is maintained in the non-blocking position and the locking collar 82 can move to the locked position to lock the differential 32. However, once the axle speed is at or above the threshold speed, the blocking member 103 is moved to the blocking position, thereby inhibiting the lock collar 82 from moving to the locked position. In other embodiments (not shown), the resilient member 132 can be other types of resilient members, for example a disc spring such as a Belleville washer.

In one embodiment, the blocking member 103 can be configured to move the locking collar 82 from the locked position to the unlocked position when the axle speed rises above the threshold speed. For example, if the lock collar 82 is in the locked position (as illustrated in FIG. 3) and the axle speed rises above the threshold speed, the blocking member 103 can move from the non-blocking position to the blocking position to push the lock collar 82 to the unlocked position to unlock the differential 32.

The differential assembly 20 can include a selector switch that is associated with the differential lock 74 to facilitate control of the differential lock 74 by an operator of the vehicle 10. The selector switch can be configured for actuation by an operator between a lock-initiate position and an unlock-initiate position. For example, the selector switch can be moved into the unlock-initiate position when the operator wants to unlock the differential 32. The selector switch can be moved into the lock-initiate position when the operator wants to lock the differential 32. It will be appreciated however, that when the selector switch is moved into the lock-initiate position, the differential 32 will not lock unless the axle speed is below the threshold speed. In one embodiment, the selector switch can be mounted within reach of an operator (e.g., along an interior console of a vehicle) such that the operator can manually actuate the selector switch between a lock-initiate position and an unlock-initiate position to effect locking and unlocking of the differential 32.

The selector switch can comprise a pushbutton, a rotary switch, or toggle switch, a relay, solid state device, or any of a variety of other suitable devices or components. It will be appreciated that, with respect to a solid state device, a "position" of the selector switch can comprise a state of the solid state device.

Figure 15:
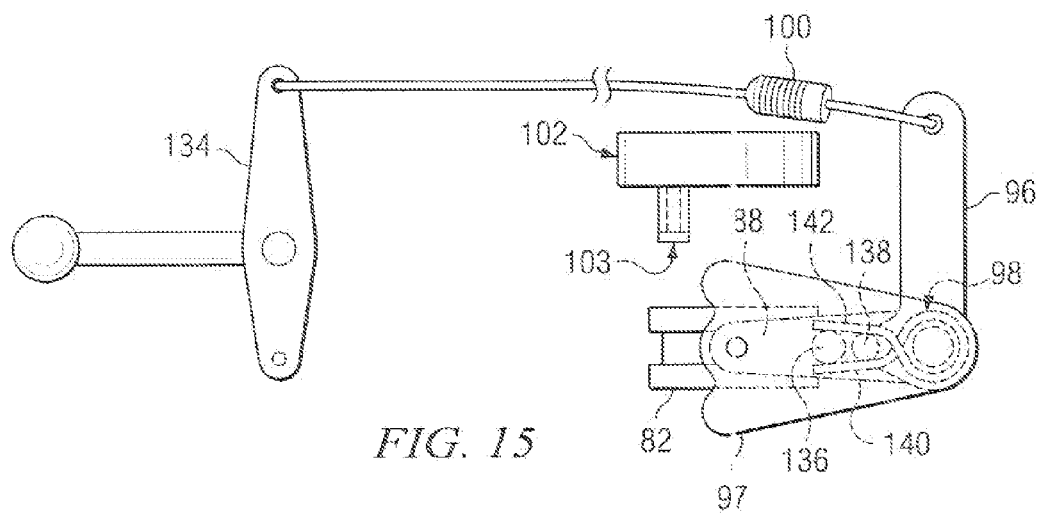
FIG. 15 is a schematic view of a selector switch coupled with the shift assembly of FIG. 8, wherein the selector switch is in an unlock-initiate position, the blocking member is in the non-blocking position, and the lock collar is in the unlocked position.
Figure 16:
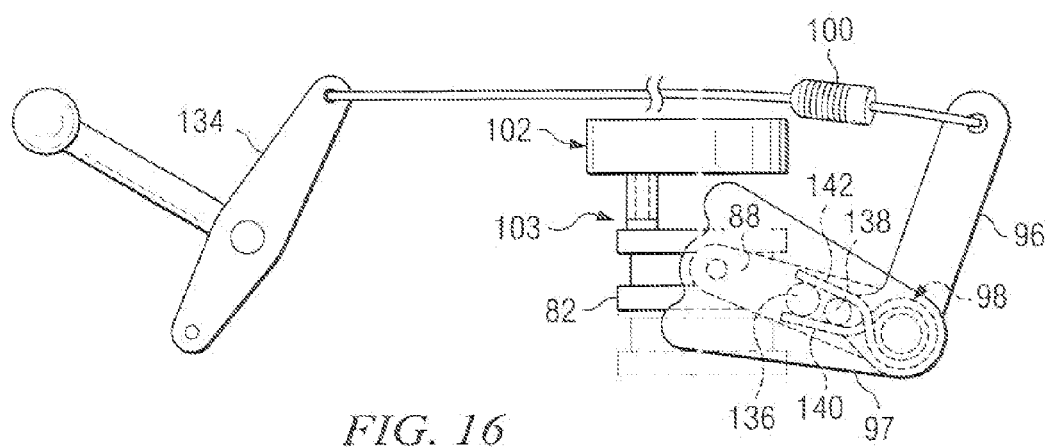
FIG. 16 is a schematic view of the selector switch coupled with the shift assembly of FIG. 8, wherein the selector switch is in a lock-initiate position, the blocking member is in the non-blocking position, and the lock collar is in the locked position.
Figure 17:
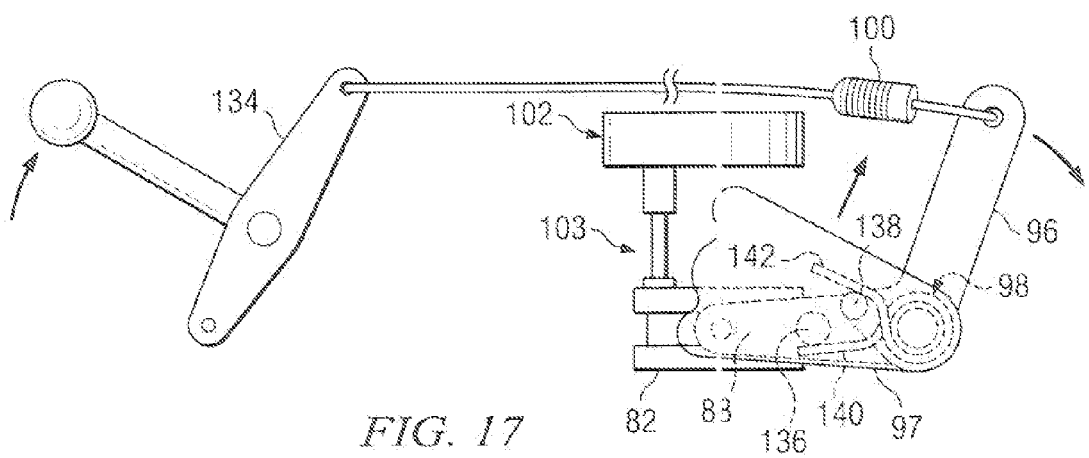
FIG. 17 is a schematic view of the selector switch coupled with the shift assembly of FIG. 8, wherein the selector switch is in the lock-initiate position, the blocking member is in the blocking position, and the lock collar is in the unlocked position.
Figure 18:
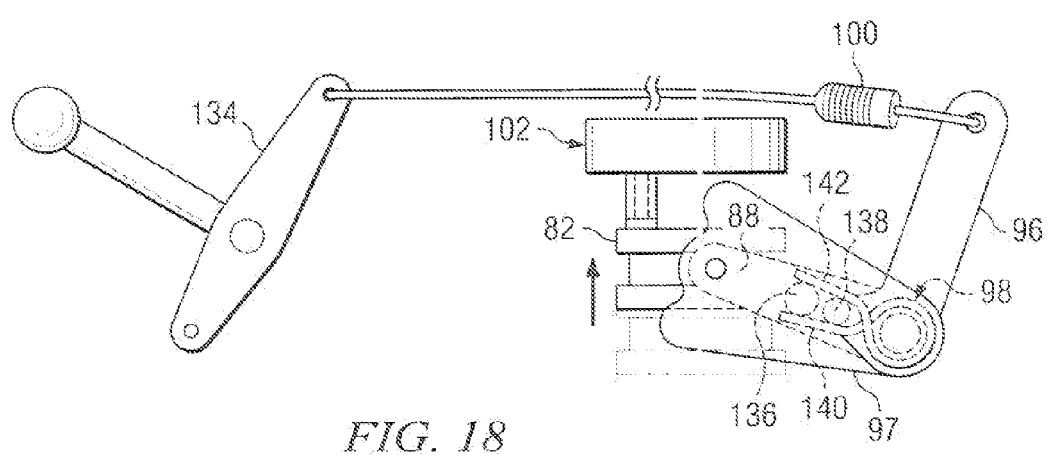
FIG. 18 is a schematic view of the selector switch coupled with the shift assembly of FIG. 8, wherein the selector switch is in the lock-initiate position, the blocking member is in the non-blocking position, and the lock collar is in the locked position.

In one embodiment, the selector switch can comprise a differential lock lever 134 that is movable between an unlock-initiate position, as illustrated in FIG. 15, and a lock-initiate position, as illustrated in FIG. 16. The differential lock lever 134 can be coupled with the shift arm 96 with the differential lock cable 100. The attachment member 91 can include a protrusion 136 and the a stop member 97 can include a protrusion 138. The resilient member 98 can include a pair of arms 140, 142 that engage the protrusions 136, 138. When the blocking member 103 is in the non-blocking position, as illustrated in FIGS. 15 and 16, movement of the differential lock lever 134 between the unlock-initiate position and the lock-initiate position moves the locking collar 82 between the respective unlocked position and the locked position. In particular, the pair of arms 140, 142 can maintain the protrusions 136, 138 substantially fixed with respect to one another such that movement of the shift arm 96 correspondingly moves the lock fork 88. However, it will be appreciated by comparing FIGS. 17 and 18, that when the blocking member 103 is in the blocking position, movement of the differential lock lever 134 into the lock-initiate position does not immediately move the lock collar 82 to the locked position. In such an arrangement, as illustrated in FIG. 17, when the differential lock lever 134 is moved to the lock-initiate position, the shift arm 96 rotates relative to the lock fork 88. Since the lock collar 82 is held in the unlocked position by the blocking member 103, the protrusions 136, 138 are spread apart, thereby placing the pair of arms 140, 142 under tension. When the blocking member 103 is returned to the non-blocking position, as illustrated in FIG. 18, the pair of arms 140, 142 interacts with the protrusions to move the lock collar 82 to the locked position.

Figure 19:
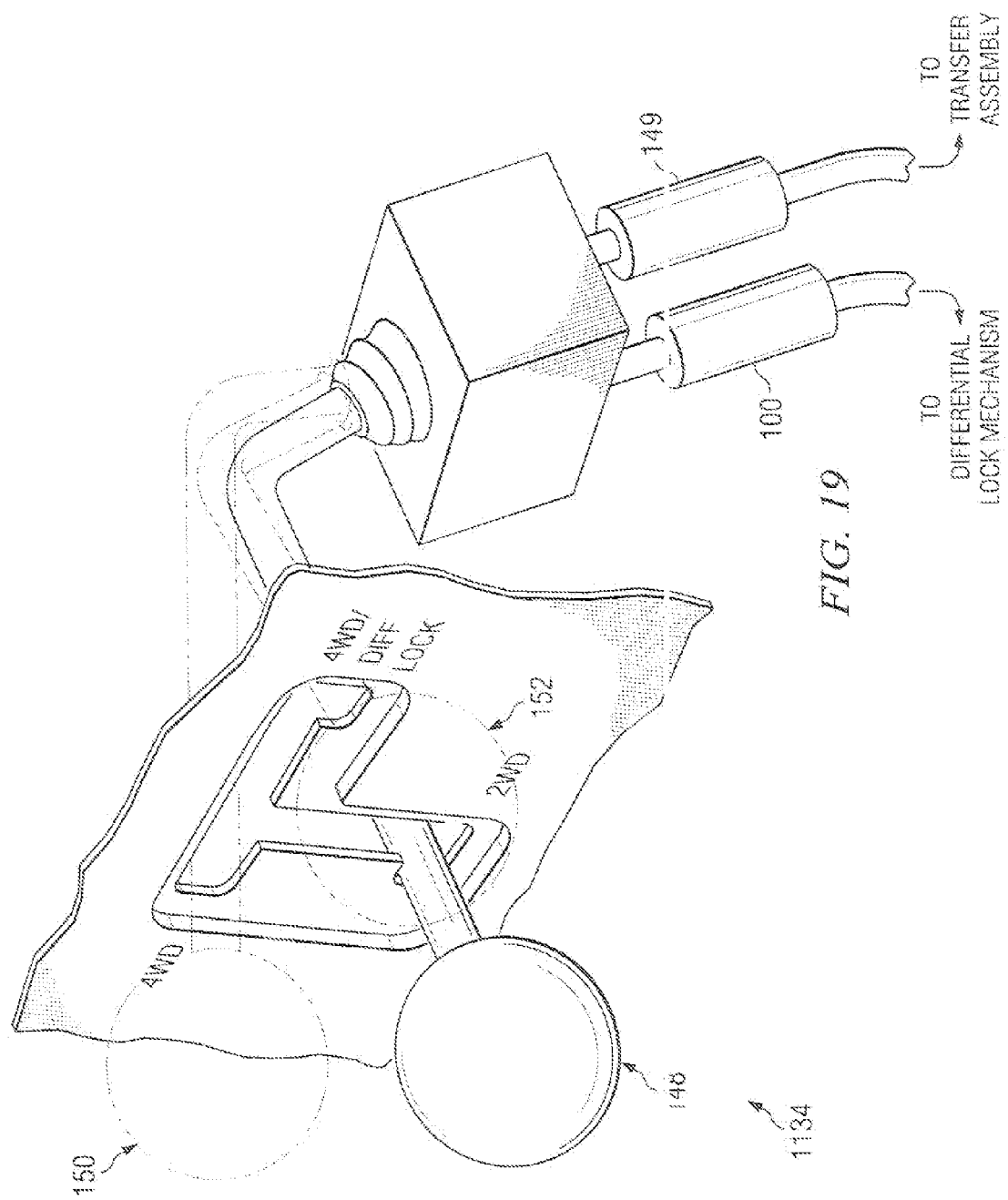
FIG. 19 is a perspective view of an alternative embodiment of a selector switch.

In an alternative embodiment, and as illustrated in FIG. 19, the selector switch can comprise a two-wheel drive (2WD)/four-wheel drive (4WD) lever 1134. The 2WD/4WD lever 1134 can be operably coupled with the differential lock cable 100 and a transfer assembly cable 149. The 2WD/4WD lever 1134 can be movable between a 2WD position 148, a 4WD position 150, and a 4WD/Differential lock position 152. In such an arrangement, an operator can move the 2WD/4WD lever 1134 between the 2WD, 4WD, and 4WD/Differential Lock positions 148, 150, and 152 to facilitate simultaneous control of the 2WD/4WD operation of the vehicle 10 as well as control of the operation of the lock collar 82. For example, when the 2WD/4WD lever 1134 is moved to the 2WD position 148, the vehicle 10 operates in a 2WD mode (e.g., either the front or rear wheels 14, 16 are driven by the engine) and the lock collar 82 is moved to the unlocked position. When the 2WD/4WD lever 1134 is moved to the 4WD position 150, the vehicle 10 operates in a 4WD mode (e.g., the front and rear wheels 14, 16 are driven by the engine) and the lock collar 82 is moved to the unlocked position. When the 2WD/4WD lever 102 is moved to the 4WD/Differential Lock position 152, the vehicle 10 operates in the 4WD mode and the shift arm 96 is moved into the lock initiate position (e.g., to facilitate movement of the lock collar 82 in the locked position).

Figure 20:
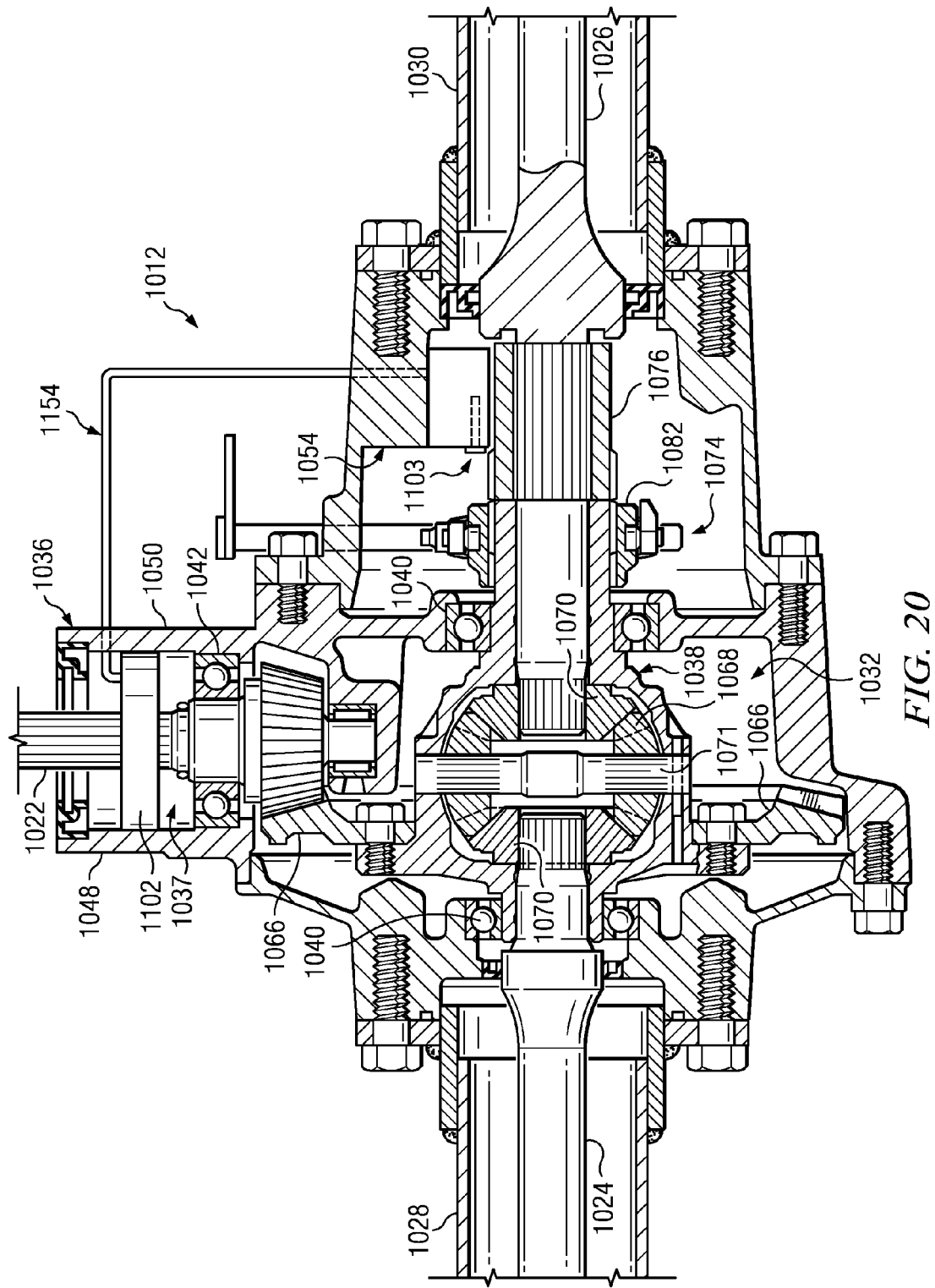
FIG. 20 is a cross-sectional view of the axle assembly shown schematically in FIG. 1, according to an alternative embodiment, with the lock collar in the unlocked position and the blocking member in a non-blocking position.
Figure 21:
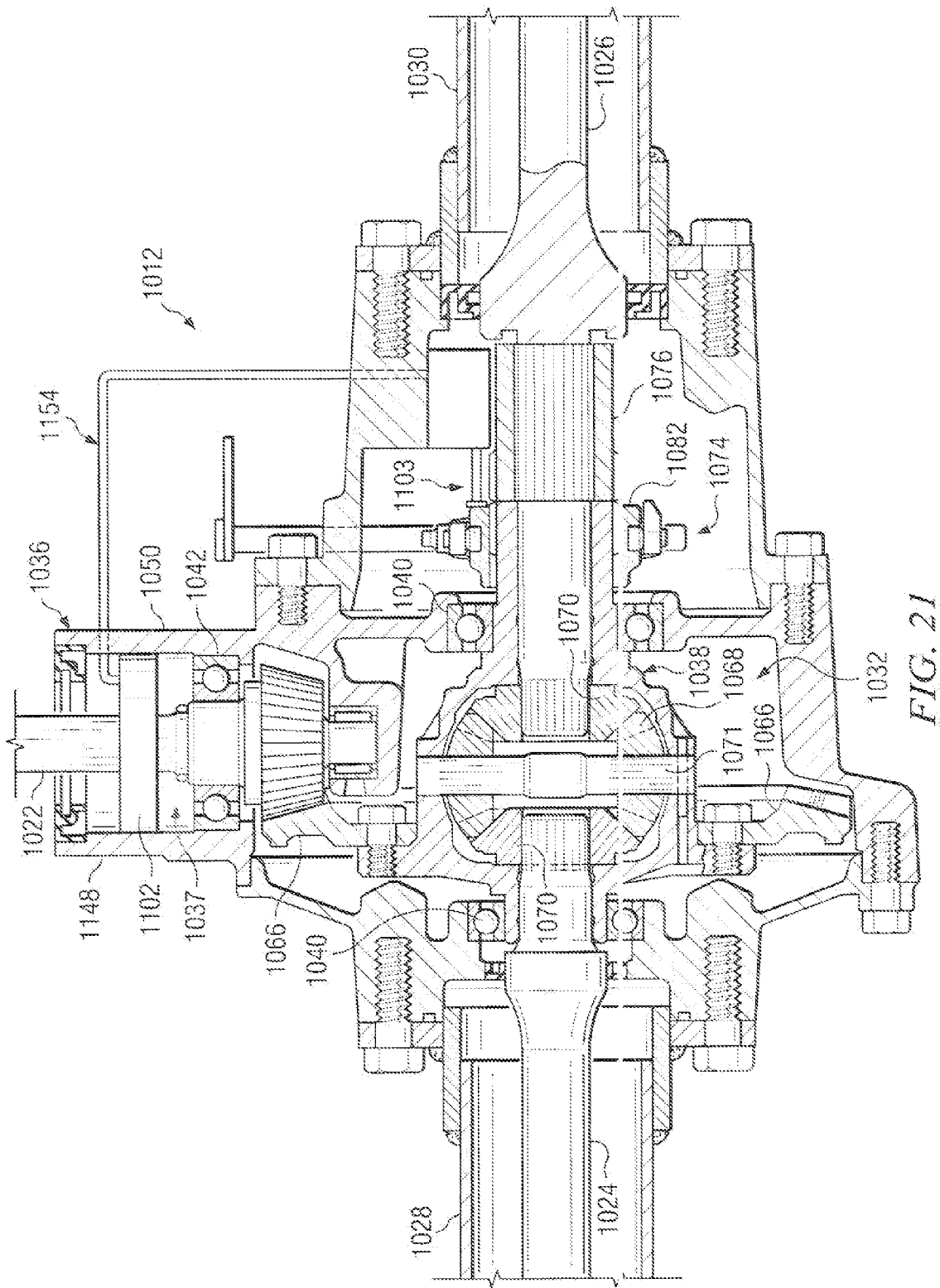
FIG. 21 is a cross-sectional view similar to FIG. 2, but with the blocking member in a blocking position.

FIGS. 20 and 21 illustrate an axle assembly 1012 according to another embodiment. The axle assembly 1012 can be similar to, or the same as, axle assembly 12 in many respects as shown in FIGS. 2-4. For example, axle assembly 1012 includes a differential assembly 1020 and an input member 1022 that can be coupled, at an end to a driveshaft. The axle assembly 1012 also includes rotatable axles 1024 and 1026 that can be disposed within axle tubes 1028 and 1030, respectively. The differential assembly 1012 includes a differential 1032 that can be disposed within a fluid receptacle 1037 that is defined by a housing 1036. The differential 1032 can also include a rotatable carrier 1038 that can be journalled within the housing 1036 by a pair of bearings 1040. Input member 1022 can be journalled within housing 1036 by a hearing 1042. Torque can be transferred from a vehicle driveshaft to axles 1024 and 1026 via input member 1022, ring gear 1066, pinion gears 1068 which can be secured to rotatable carrier 1038 via shaft 1071, and side gears 1070 which can be secured to respective ones of the axles 1024 and 1026.

The axle assembly 1012 further includes a differential lock 1074 that can include a lock sleeve 1076. The lock sleeve 1076 can be co-axially disposed about the right axle 1026 and rotatable with the right axle 1026. The differential lock 1074 can also include a lock collar 1082 that movable relative to the lock sleeve 1076 between an unlocked position and a locked position to facilitate unlocking and locking of the differential 1032. The axle assembly 1012 can also include a gerotor 1102 and a blocking member 1103.

The axle assembly 1012, however, can differ from axle assembly 12 in some instances. The gerotor 1102 can be coupled with the input member 1022. In such an embodiment, an inner rotor (not shown) of the gerotor 1102 can be radially disposed about the input member 1022 such that rotation of the input member 1022 correspondingly rotates the inner rotor and an outer rotor (not shown). The gerotor 1102 can be supported within the fluid receptacle 1037 by members 1048 and 1050.

The blocking member 1103 can be secured to member 1054 adjacent to the differential lock 1074. The blocking member 1103 can be in fluid communication with the gerotor 1102 via a passageway 1154. It will be appreciated that the passageway 1154 can be integrated into the housing 1036 or alternatively can detachable from the housing 1036 as a stand alone component. When the input member 1022 rotates, the gerotor 1102 can pump differential fluid from the fluid receptacle 1037, through the passageway 1154 and to the blocking member 1103 to move the blocking member 1103 from a non-blocking position (as illustrated in FIG. 20) to a blocking position (as illustrated in FIG. 21). When the blocking member 1103 is in the non-blocking position, the lock collar 1082 is free to move between the unlocked and locked positions. However, when the blocking member 1103 is moved to the blocking position, as illustrated in FIG. 21, the blocking member 1103 contacts the locking collar 1082 to inhibit the locking collar 1082 from moving to the locked position.

It will be appreciated that, when the speed of the input member 1022 (e.g., input speed) increases (e.g., to accelerate the vehicle 10), it may become more difficult to move the lock collar 1082 without damaging the axle assembly 1012. Therefore, the blocking member 1103 can be configured to inhibit movement of the lock collar 1082 into the locked position when the input speed is above a threshold speed. It will be appreciated that any of a variety of suitable alternative pumps can be coupled with an axle or an input member to facilitate actuation of a blocking member.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A differential assembly comprising:
   an axle;
   a differential coupled with the axle and configured to facilitate operation of the axle at an axle speed;
   a differential lock associated with the differential and movable between a locked position and an unlocked position;
   a blocking member associated with the differential lock and movable between a blocking position and a non-blocking position, wherein when the blocking member is in the blocking position, the differential lock is inhibited from moving to the locked position; and
   a pump comprising an outlet in fluid communication with the blocking member, the pump being operably coupled with the axle and configured to facilitate movement of the blocking member into the blocking position when the axle speed is above a threshold speed.

2. The differential assembly of claim 1 wherein the differential further comprises a housing defining a fluid receptacle and the pump further comprises an inlet in fluid communication with the fluid receptacle.

3. The differential assembly of claim 2 wherein the pump is at least partially disposed within the fluid receptacle.

4. The differential assembly of claim 3 wherein the differential lock comprises a collar radially supported by the axle and slideable with respect to the axle between the locked position and the unlocked position.

5. The differential assembly of claim 4 wherein the pump is configured to support the blocking member adjacent to the collar.

6. The differential assembly of claim 5 wherein the blocking member comprises a linear actuator that selectively contacts the collar when the blocking member is moved between the blocking and non-blocking positions.

7. The differential assembly of claim 2 wherein the pump comprises a gerotor rotatably coupled with the axle.

8. The differential assembly of claim 1 further comprising a selector switch coupled with the differential lock and movable between a lock-initiate position and an unlock-initiate position, wherein movement of the selector switch to the lock-initiate position facilitates movement of the differential lock into the locked position if the blocking member is in the non-blocking position.

9. The differential assembly of claim 1 wherein when the axle speed is above the threshold speed, the blocking member is configured to automatically move from the blocking position to the non-blocking position when the axle speed decreases below the threshold speed.

10. A differential assembly comprising:
    a differential comprising:
      an input member configured for operation at an input speed; and
      a housing defining a fluid receptacle;
    a differential lock associated with the differential and movable between a locked position and an unlocked position;
    a blocking member associated with the differential lock and movable between a blocking position and a non-blocking position, wherein when the blocking member is in the blocking position, the differential lock is inhibited from moving to the locked position; and
    a pump rotatably coupled with the input member and comprising an inlet and an outlet, wherein the pump is at least partially disposed within the fluid receptacle, the inlet is in fluid communication with the fluid receptacle, the outlet is in fluid communication with the blocking member, and the pump is configured to facilitate movement of the blocking member into the blocking position when the input speed is above a threshold speed.

11. The differential assembly of claim 10 wherein the pump comprises a gerotor rotatably coupled with the input member.

12. The differential assembly of claim 11 further comprising an axle coupled with the differential, wherein the differential lock comprises a collar radially supported by the axle and slideable with respect to the axle between the locked position and the unlocked position.

13. The differential assembly of claim 12 wherein the blocking member comprises a linear actuator and wherein a housing member is configured to support the linear actuator adjacent the collar.

14. The differential assembly of claim 13 wherein the linear actuator selectively contacts the collar when the linear actuator is moved between the blocking and non-blocking positions.

15. A differential assembly comprising:
a left axle;
a right axle;
a housing defining a fluid receptacle;
a differential supported within the fluid receptacle, the differential being coupled with the left and right axles and configured to facilitate operation of the left and right axles at respective left and right axle speeds;
a differential lock associated with the differential and one of the left and right axles, the differential lock being movable between a locked position and an unlocked position;
a blocking member associated with the differential lock and movable between a blocking position and a non-blocking position, wherein when the blocking member is in the blocking position, the differential lock is inhibited from moving to the locked position; and
a gerotor disposed at least partially within the fluid receptacle and coupled with one of the left and right axles; the gerotor comprising:
an outlet in fluid communication with the blocking member; and
an inlet in fluid communication with the fluid receptacle;
wherein the gerotor facilitates movement of the blocking member into the blocking position when one of the left and right axle speeds is above a threshold speed.

16. The differential assembly of claim 15 wherein the blocking member comprises a hydraulic actuator.

17. The differential assembly of claim 15 further comprising a selector switch coupled with the differential lock and movable between a lock-initiate position and an unlock-initiate position, wherein movement of the selector switch to the lock-initiate position facilitates movement of the differential lock into the locked position if the blocking member is in the non-blocking position.

18. A vehicle comprising:
a left axle;
a right axle;
a left wheel rotatably coupled with the left axle;
a right wheel rotatably coupled with the right axle;
a differential coupled with the left axle and the right axle and configured to facilitate operation of at least one of the left and right axle at an axle speed;
a differential lock associated with the differential and movable between a locked position and an unlocked position;
a blocking member associated with the differential lock and movable between a blocking position and a non-blocking position, wherein when the blocking member is in the blocking position, the differential lock is inhibited from moving to the locked position; and
a pump comprising an outlet in fluid communication with the blocking member, the pump being operably coupled with one of the left axle and the right axle and configured to facilitate movement of the blocking member into the blocking position when the axle speed is above a threshold speed.

19. The vehicle of claim 18 wherein the differential further comprises a housing defining a fluid receptacle and the pump further comprises an inlet in fluid communication with the fluid receptacle.

20. The vehicle of claim 19 wherein the pump comprises a gerotor.

* * * * *